(12) United States Patent
Hannel

(10) Patent No.: US 9,849,844 B2
(45) Date of Patent: Dec. 26, 2017

(54) CUSTOM BADGES FOR VEHICLES

(71) Applicant: Johnathan S. Hannel, Indianapolis, IN (US)

(72) Inventor: Johnathan S. Hannel, Indianapolis, IN (US)

( * ) Notice: Subject to any disclaimer, the term of this patent is extended or adjusted under 35 U.S.C. 154(b) by 0 days.

(21) Appl. No.: 15/400,550

(22) Filed: Jan. 6, 2017

(65) Prior Publication Data

US 2017/0190303 A1 Jul. 6, 2017

Related U.S. Application Data

(60) Provisional application No. 62/275,528, filed on Jan. 6, 2016.

(51) Int. Cl.
*B60R 13/00* (2006.01)
*G09F 7/18* (2006.01)
*G09F 21/04* (2006.01)

(52) U.S. Cl.
CPC .............. *B60R 13/005* (2013.01); *G09F 7/18* (2013.01); *G09F 21/048* (2013.01); *G09F 2007/1852* (2013.01); *G09F 2007/1865* (2013.01); *G09F 2007/1882* (2013.01)

(58) Field of Classification Search
CPC .................................................. B60R 13/005
See application file for complete search history.

(56) References Cited

U.S. PATENT DOCUMENTS

| | | | |
|---|---|---|---|
| 1,310,234 A | 7/1919 | Denning | |
| 5,211,998 A | 5/1993 | Connors | |
| 7,213,853 B2 * | 5/2007 | Elwell | B60R 13/00 296/1.08 |
| 8,196,953 B2 * | 6/2012 | Weigand | B60R 13/005 280/728.3 |
| 8,922,655 B2 * | 12/2014 | Forgue | B60R 19/52 224/309 |
| 9,150,165 B1 * | 10/2015 | Fortin | B60R 13/005 |
| 9,452,708 B2 * | 9/2016 | Salter | B60R 13/005 |

* cited by examiner

*Primary Examiner* — Gary C Hoge
(74) *Attorney, Agent, or Firm* — Maginot, Moore & Beck, LLP

(57) ABSTRACT

The present invention, Simple Custom Auto Badge (SCAB), relates to decorating or rebranding a car. SCAB covers the existing manufacture emblem by fitting over and attaching securely to the automobile body or grill, to provide a platform where the user (automobile owner) can display an emblem or logo of choice. The face may consist of art, pictures, words, phrases, and numbers or may just be colored or shaped differently than the manufacture emblem that it covers. It will come in various shapes. The SCAB will be manufactured to fit securely, cover, and attach around the existing manufacturer's emblem.

6 Claims, 5 Drawing Sheets

CUSTOM BADGES FOR VEHICLES

BACKGROUND OF THE INVENTION

This invention relates to the field of automobile customization and personalization.

Automobile customization is a multibillion-dollar industry. There are many products on the market that allow a vehicle owner to display a custom emblem or badge on his/her automobile. These can be made from various plastics, metals, and other materials. Customization products range from window stickers and magnetized metal emblems that stick to the window or the body of a car. Of course, people use license plates, bumper stickers, window stickers, magnets, etc. to personalize their automobiles. The manufacturer's emblem (logo) usually often occupies the center spot at the front and back of an automobile. Some automobiles even have large manufacturer's emblems built into the front grill.

Attaching decorative elements to the exterior of an automobile is as old as automobiles themselves. For instance, U.S. Pat. No. 1,310,234, issued on Jul. 15, 1919 to T. F. Denning relates to the attachment of a wind wheel and flag to the radiator cap of an automobile. Another example is U.S. Pat. No. 5,211,998, issued on May 18, 1993, to Frank R Connors and Caroline M Connors of East Quogue, N.Y. This device, like the previous, was meant to mount decorative devices, flags, and emblems to the hood ornament of the automobile.

BRIEF SUMMARY OF THE PRESENT INVENTION

The present invention differs from the devices mentioned above, and all others, because it covers the manufacture's emblem to create a platform that can display a new personalized or custom auto badge, right where that manufactures emblem (logo) continues to exist on the front or the back of the automobile. This invention is generally constructed in a concave fashion allowing it enough clearance, as necessary, to completely cover the existing emblem and attach flush to the car. Generally a shape of round, oval or rectangle can be used to completely cover the existing emblem and provides a platform for a new sticker, metal logo, or custom printed material to adhere to the Simple Custom Auto Badge (SCAB).

Until now, without the use of the SCAB, one would be required to remove the existing manufacture's logo to add a custom sticker or emblem in this area. However, removing the manufacture's logo often leaves unsightly holes or an indention or void when removed, making it difficult to make the new personalized logo look good or like it was meant to be that way.

The present invention is a Simple Custom Auto Badge, or SCAB, which provides a new and easy way to personalize an automobile by covering the existing manufacturer's emblem (logo) on the rear or front of the car and providing a platform on which a new or customized message, emblem, badge, logo, plate, etc. can be securely attached and displayed.

The SCAB comprises a base that covers the manufacturer's logo and attaches to the body of the automobile, over the existing Manufacture's emblem, at either/both the front or rear of the automobile. This product requires unique designs based on each auto manufacturer's make, model, and year. This will require a SCAB to be made specifically for a particular make, model, and year of the automobile with varying attachment techniques and properties. SCABs can be made from various plastics, metals, and other materials; they consist of a skin that covers and attaches to the existing manufacturer's logo to provide a uniform platform, of the same or an entirely different shape, to display a custom design, logo, picture, words, art, etc.

LABELS ON THE FIGURES

Figure 1A:
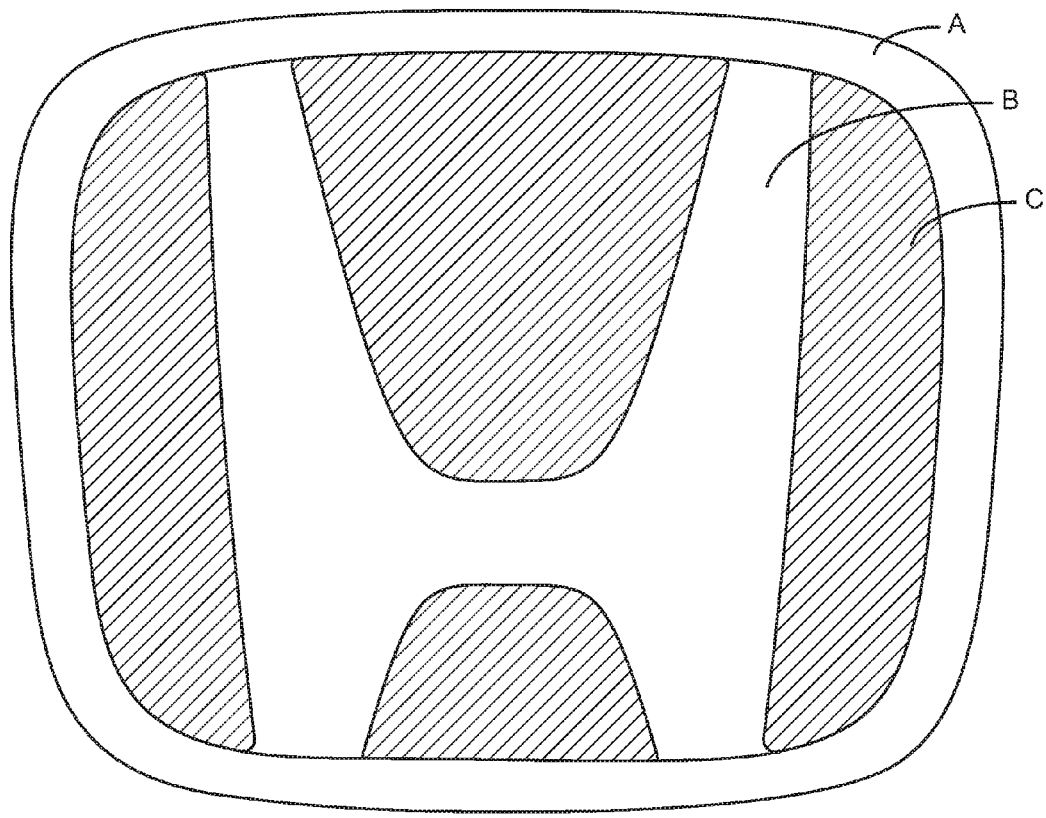
FIG. 1A is a perspective view of an example manufacturer's logo (front of automobile)

A. Outer rim of the manufacturer's logo (front, plastic metal-looking, grill integrated)
B. Embossed manufacturer's logo
C. Voided area of the manufacturer's logo
D. Manufacturer's logo (rear)
E. Void area revealing car body
F. Decorative attachment location
G. Automobile body panel
H. Manufacture Emblem
I. Manufacture Emblem
J. Automobile body—car grill
1. Back (underside) of SCAB
2. Rim of SCAB
3. Example of hook and loop fastening solution between SCAB and car body
4. Example of hole used for zip tie fastening solution
5. Zip tie fastening solution
6. Void area to fit securely over the manufacturer's logo
7. Body of SCAB
8. Body of SCAB
9. Body of SCAB
10. Body of SCAB
11. Set screw or securing pin or plastic tab fastening solution
12. Magnetic fastening solution
13. Hook and loop (and other flexible adhesive application) fastening solution
14. Zip tie or corded attachment solution

DETAILED DESCRIPTION OF THE PRESENT INVENTION

Figure 1B:
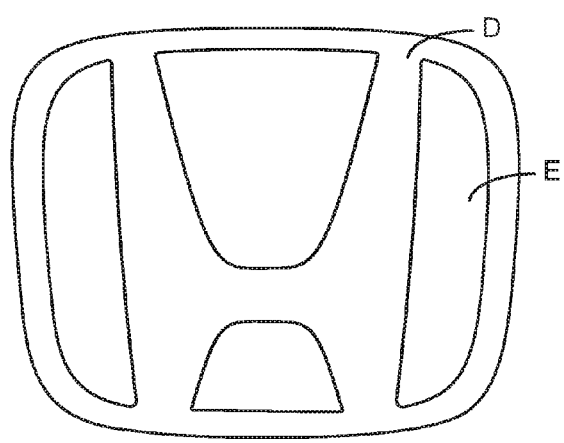
FIG. 1B is a perspective view of an example manufacturer's logo (rear of automobile)
Figure 2A:
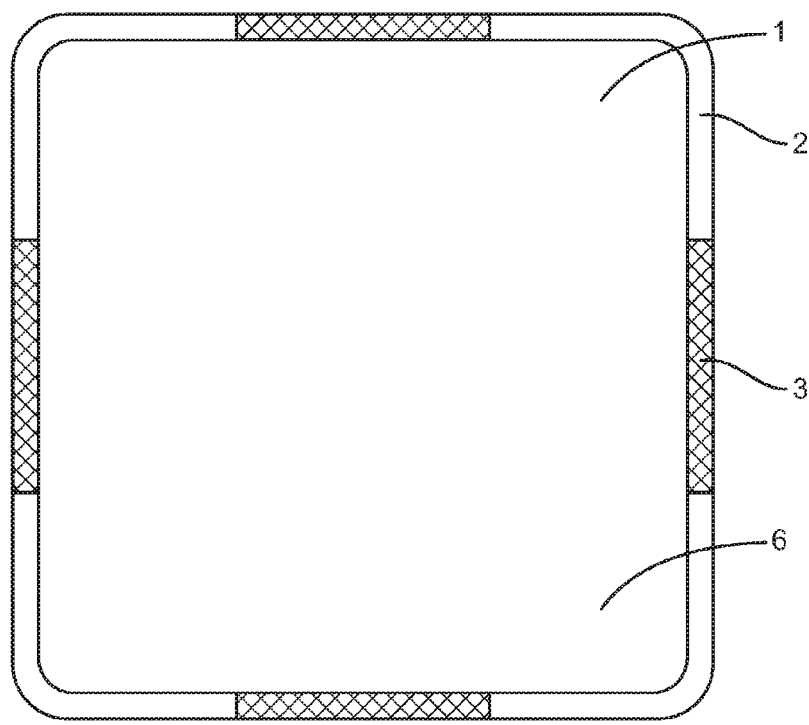
FIG. 2 is a perspective view of the underside of the SCAB
Figure 2B:
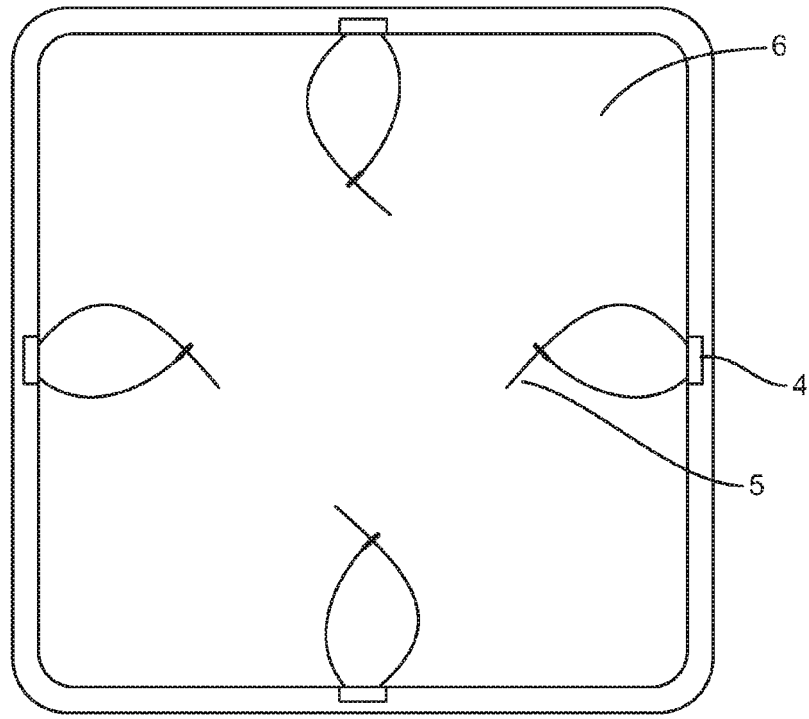

The SCAB shown in FIG. 2 is adapted to be attached to the vehicle around any manufacturer's emblem FIG. 1A, 1B.

It is adapted to affix solidly to the vehicle body fitting around the manufacturer's emblem to cover it completely.

Figure 3:
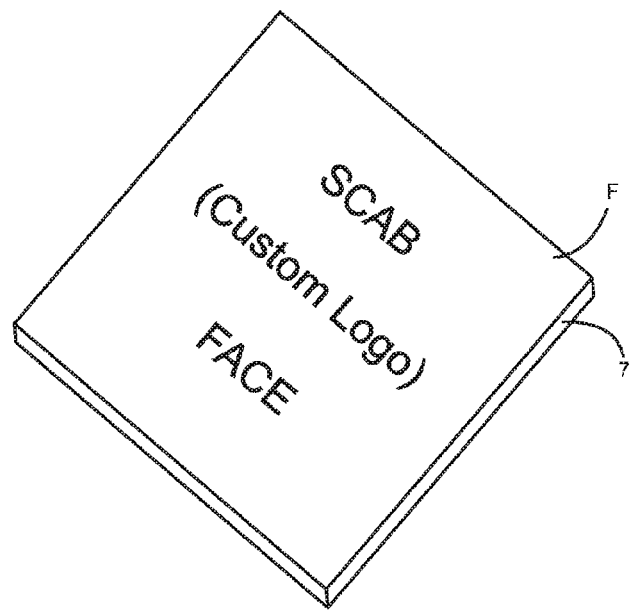
FIG. 3 is a perspective view of an example of a SCAB Face (the decorative addition to the SCAB)
Figure 5:
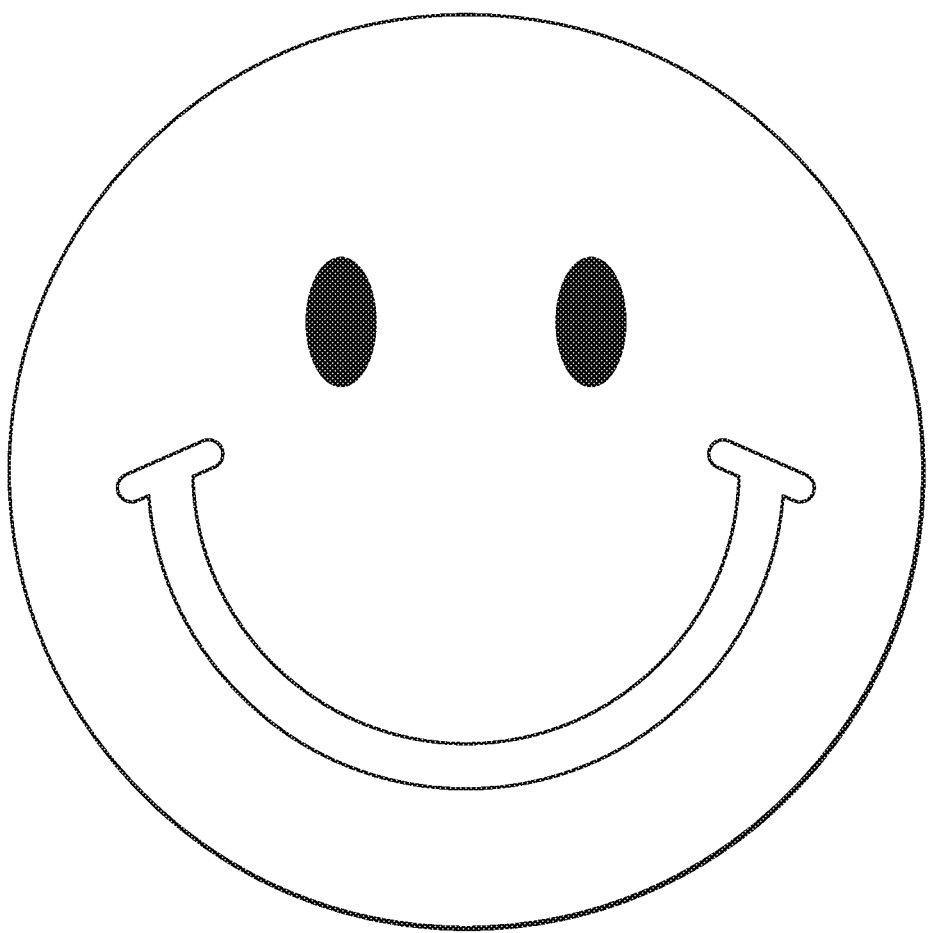
FIG. 5 is a perspective view of an example SCAB Face (Smiley, round)

The SCAB Face FIG. 3 may include a custom design, such as a unique logo, a team logo, a picture, and the like of any shape size or durable material. It is affixed to the SCAB however necessary. The SCAB defines a cavity (1) at its back or underside that is sized to receive the vehicle emblem entirely therein. The perimeter (2) or rim of the SCAB is also sized to completely surround the vehicle emblem. The perimeter (2) may be in the form of a flange with a flat underside surface for flush contact with the vehicle body. The SCAB can have different geometric shapes, such as rectangular as shown in FIG. 2 or circular as shown in FIG. 5, provided that the cavity and perimeter engulf the vehicle emblem. Alternatively, the SCAB can have the same shape as the vehicle emblem. The body has a height or thickness that is sufficient to cover the vehicle emblem without projecting too far from the vehicle body.

Figure 4A:
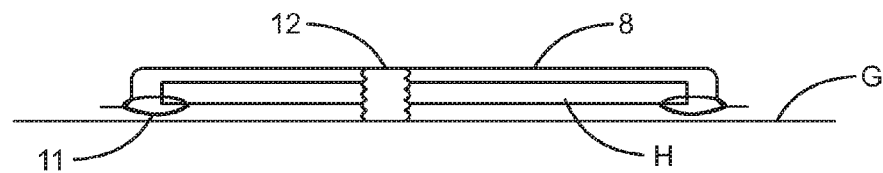
FIG. 4a is a profile view of the SCAB, manufacture emblem, and car body showing plastic tab and magnet attachment solution

The SCAB may be formed with a variety of materials, as described above. The SCAB (8, 9, 10) may possess connection mechanisms or means for attaching the SCAB to the vehicle body, such as plastic connector tabs (11), magnets (12), hook and loop fasteners (13), various other adhesive materials (13), and/or other connection devices such as foam fill. The plastic connector tabs (11) project inwardly from the perimeter of the SCAB to engage the vehicle emblem itself as shown in FIG. 4a. The connector tabs (11) may be replaced with set screws or position pins that are fastened to the perimeter of the SCAB and configured to be driven inward to engage the vehicle emblem. Other means for attaching the SCAB to the vehicle can include form-fitted features within the cavities (6), that are configured for a snug fit around the manufacturer's emblem on a vehicle. In the example of FIG. 2, the SCAB) fits over the manufacture emblem, such as shown in FIG. 1, to allow the display of a custom emblem (as depicted in FIG. 5).

Figure 4B:
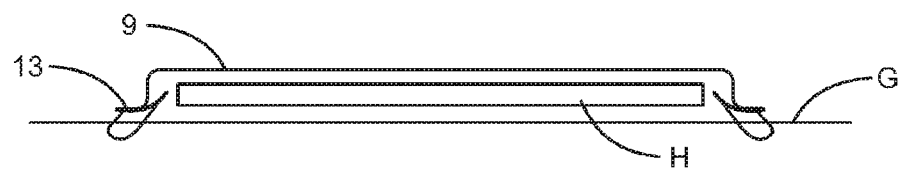
FIG. 4b is a profile view of the SCAB, manufacture emblem, and car body showing hook and loop fastening solution
Figure 4C:
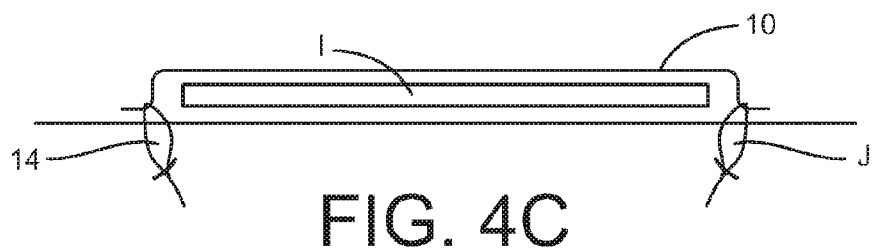
FIG. 4c is a profile view of the SCAB, manufacture emblem, and car body showing a zip tie looping attachment solution
Figure 6:
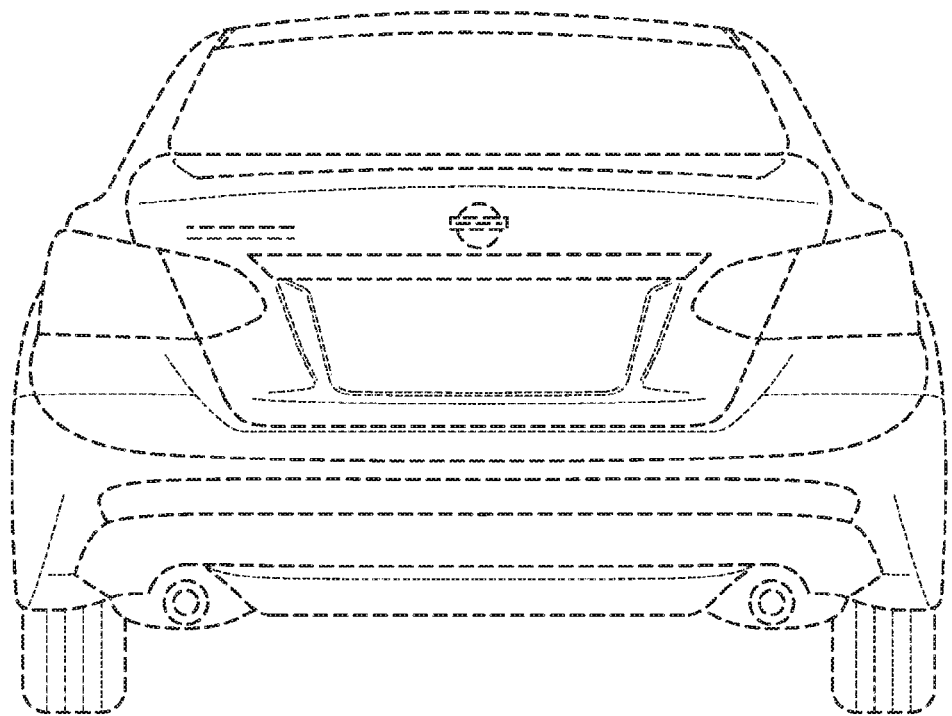
FIG. 6 is a perspective view of the rear of an automobile without a SCAB
Figure 7:
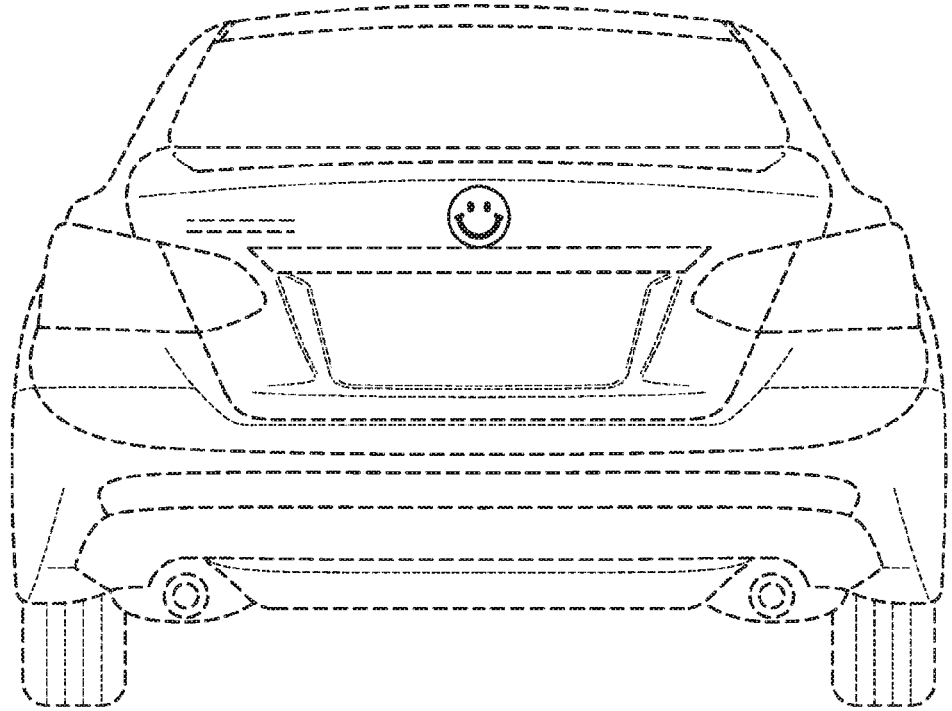
FIG. 7 is a perspective view of the rear of an automobile with a SCAB (rear, smiley)

FIG. 6 shows a normal automobile without a SCAB while FIG. 7 is the same automobile with a SCAB display. As shown in FIG. 4a, the vehicle body and the SCAB (8) include mating connector tabs. Alternatively or in addition, the SCAB may include magnets (12) that are magnetically attracted to the vehicle body. In FIG. 4b, mating hook and loop fasteners (13) may be applied around the perimeter of the SCAB (9) and to the vehicle body (G) around the vehicle emblem. In FIG. 4c, the SCAB (10) includes zip ties (14) that pass through the perimeter of the SCAB and through appropriate openings in the vehicle body (J).

The application of this new way to customize an automobile is depicted by FIG. 7, in which the automobile emblem on the back of a car is covered with a SCAB having a smiley face.

The present invention contemplates a simple custom auto badge (SCAB) that covers the existing automobile manufacturer's emblem.

The SCAB may incorporate the following features:
1. The SCAB is molded to fit to and around the existing manufacturer's logo
2. The SCAB attaches securely to the automobile and covers the existing manufacturer's logo
3. The SCAB may attach to the car body and cover the manufacturer's logo
4. The SCAB may attach to the car grill and cover the manufacturer's logo
5. The SCAB provides a platform to display a custom logo or graphic
6. The SCAB can be a similar shape and size as the existing logo
7. The SCAB may be a completely different size or shape compared to the existing manufacturer's logo
8. The SCAB may be manufactured from various plastics, metals, and other materials
9. The SCAB attaches to the automobile by us of adhesive materials, magnets, secure ties, set screws, lock pins, tabs, straps, tap screws, or some other method of secure attachment such as a hook and loop system
10. The SCAB may be attached permanently or may be removed or replaced

What is claimed is:

1. A custom badge for a vehicle having an emblem affixed to the vehicle body, the custom badge comprising:
   a body defining a cavity sized to receive the vehicle emblem therein and a perimeter sized to surround the vehicle emblem; and
   means at the perimeter of the body for attaching the body to the vehicle with the vehicle emblem contained within the cavity of the body, wherein the means for attaching includes one or more magnets mounted to the body within the cavity of the body.

2. The custom badge of claim 1, wherein the body includes an exposed face, the exposed face including a logo or design different from the vehicle emblem.

3. A custom badge for a vehicle having an emblem affixed to the vehicle body, the custom badge comprising:
   a body defining a cavity sized to receive the vehicle emblem therein and a perimeter sized to surround the vehicle emblem; and
   means at the perimeter of the body for attaching the body to the vehicle with the vehicle emblem contained within the cavity of the body, wherein the means for attaching includes a hook and loop fastener arrangement, with at least one hook and loop fastener mounted to the vehicle and at least another hook and loop fastener mounted to the badge within the perimeter of the badge.

4. The custom badge of claim 3, wherein the body includes an exposed face, the exposed face including a logo or design different from the vehicle emblem.

5. A custom badge for a vehicle having an emblem affixed to the vehicle body, the custom badge comprising:
   a body defining a cavity sized to receive the vehicle emblem therein and a perimeter sized to surround the vehicle emblem; and
   means at the perimeter of the body for attaching the body to the vehicle with the vehicle emblem contained within the cavity of the body, wherein the means for attaching includes a number of cable ties passing through corresponding openings in the badge and the vehicle body.

6. The custom badge of claim 5, wherein the body includes an exposed face, the exposed face including a logo or design different from the vehicle emblem.

* * * * *